US011668087B2

(12) United States Patent
Austrheim

(10) Patent No.: US 11,668,087 B2
(45) Date of Patent: *Jun. 6, 2023

(54) STORAGE SYSTEM

(71) Applicant: Autostore Technology AS, Nedre Vats (NO)

(72) Inventor: Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,082

(22) Filed: Jul. 21, 2022

(65) Prior Publication Data
US 2022/0356697 A1 Nov. 10, 2022

Related U.S. Application Data

(63) Continuation of application No. 16/765,537, filed as application No. PCT/EP2018/058871 on Apr. 6, 2018, now Pat. No. 11,441,308.

(30) Foreign Application Priority Data

Nov. 22, 2017 (NO) .................................. 20171864

(51) Int. Cl.
E04B 1/19 (2006.01)
B65G 1/04 (2006.01)
E04C 3/02 (2006.01)

(52) U.S. Cl.
CPC .............. E04B 1/1903 (2013.01); B65G 1/04 (2013.01); E04C 3/02 (2013.01);
(Continued)

(58) Field of Classification Search
CPC ........... B65G 1/04; B65G 1/0464; E04B 1/19; E04B 1/1903; E04B 2001/1924;
(Continued)

(56) References Cited

U.S. PATENT DOCUMENTS 4,637,195 A 1/1987 Davis
8,661,765 B2 3/2014 Schaefer et al.
(Continued)

FOREIGN PATENT DOCUMENTS

CA 2574745 A1 7/2008
DE 29700795 U1 3/1997
(Continued)

OTHER PUBLICATIONS

International Search Report issued in PCT/EP2018/058871 dated Aug. 21, 2018 (7 pages).
(Continued)

Primary Examiner — William V Gilbert
(74) Attorney, Agent, or Firm — Osha Bergman Watanabe & Burton LLP

(57) ABSTRACT

A storage system includes a storage grid structure; and a remotely operated storage bin handling vehicle. The storage grid structure comprises a first and a second type of vertical storage column profiles defining multiple storage columns in which storage bins can be stored one on top of another in vertical stacks. The first and second type storage column profiles are interconnected at top ends thereof by rails forming a horizontal rail grid upon which the remotely operated storage bin handling vehicle may move in two perpendicular directions. The first type of storage column profiles has a cross-section comprising a hollow centre section and four corner sections, each of the four corner sections of the first type of storage column profiles comprises two perpendicular bin guiding plates for accommodating a corner of a first storage bin. The second type of storage column profiles has a cross-section comprising a hollow centre section having at least two connecting elements arranged in, or on, an external surface of the hollow centre section, and at least one corner section, the at least
(Continued)

one corner section of the second type of storage column profiles comprises two perpendicular bin guiding plates for accommodating a corner of a second storage bin. The storage grid structure comprises a grid supporting structure comprising at least two of the second type of storage column profiles interconnected, via the at least two connecting elements of the at least two second type of storage column profiles, by vertically inclined support struts.

17 Claims, 13 Drawing Sheets

(52) U.S. Cl.
CPC ............ *E04B 2001/1924* (2013.01); *E04B 2001/1963* (2013.01); *E04B 2001/1984* (2013.01); *E04B 2001/1993* (2013.01); *E04C 2003/023* (2013.01)

(58) Field of Classification Search
CPC ....... E04B 2001/1957; E04B 2001/196; E04B 2001/1963; E04B 2001/1966; E04B 2001/1993; E04C 3/02; E04C 2003/023; E04C 2003/026; E04C 3/04; E04C 2003/0404; E04C 2003/0408; E04C 2003/0413
See application file for complete search history.

(56) References Cited

U.S. PATENT DOCUMENTS

| | | | |
|---|---|---|---|
| 9,347,213 B1 | 5/2016 | Zhang et al. | |
| 10,662,650 B2 | 5/2020 | Lacroix et al. | |
| 11,441,308 B2 * | 9/2022 | Austrheim | ............ E04B 1/1903 |
| 2008/0110127 A1 | 5/2008 | Terada et al. | |
| 2011/0149201 A1 | 6/2011 | Powell et al. | |
| 2016/0222643 A1 | 8/2016 | Castelli | |
| 2017/0129702 A1 | 5/2017 | Hognaland | |
| 2018/0058067 A1 | 3/2018 | Lake | |
| 2018/0319590 A1 | 11/2018 | Lindbo et al. | |
| 2019/0024362 A1 | 1/2019 | Pfeiffer | |
| 2019/0125079 A1 | 5/2019 | Payne | |
| 2020/0347599 A1 | 11/2020 | Lukito | |

FOREIGN PATENT DOCUMENTS

| | | |
|---|---|---|
| EP | 0823229 A1 | 2/1998 |
| GB | 1503588 A | 3/1978 |
| KR | 2013-0052642 A | 5/2013 |
| NO | 309109 B1 | 12/2000 |
| NO | 317366 B1 | 10/2004 |
| WO | 95/00727 A1 | 1/1995 |
| WO | 2011/015799 A1 | 2/2011 |
| WO | 2014090684 A1 | 6/2014 |
| WO | 2015193278 A1 | 12/2015 |
| WO | 2016198467 A1 | 12/2016 |
| WO | 2017153563 A1 | 9/2017 |

OTHER PUBLICATIONS

Written Opinion of the International Searching Authority issued in PCT/EP2018/058871 dated Aug. 21, 2018 (15 pages).
Norwegian Search Report issued in No. 20171864 dated Jun. 21, 2018 (2 pages).
Radwell International, "Radwell Swisslog AutoStore Time Lapse", youtube, Dec. 7, 2016 (Dec. 7, 2016), Retrieved from the Internet: URL:https://www.youtube.com/watch?v=Am00RbAfrTo [retrieved on Aug. 9, 2018] (1 page).

* cited by examiner

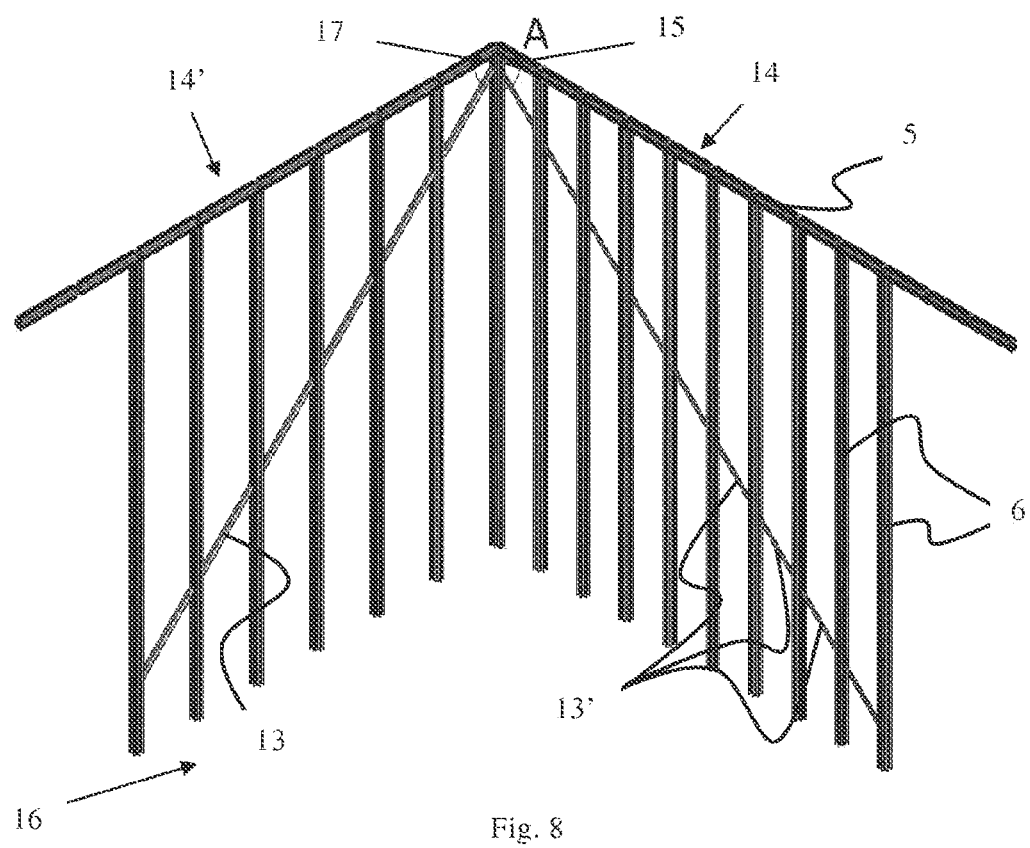
Fig. 8
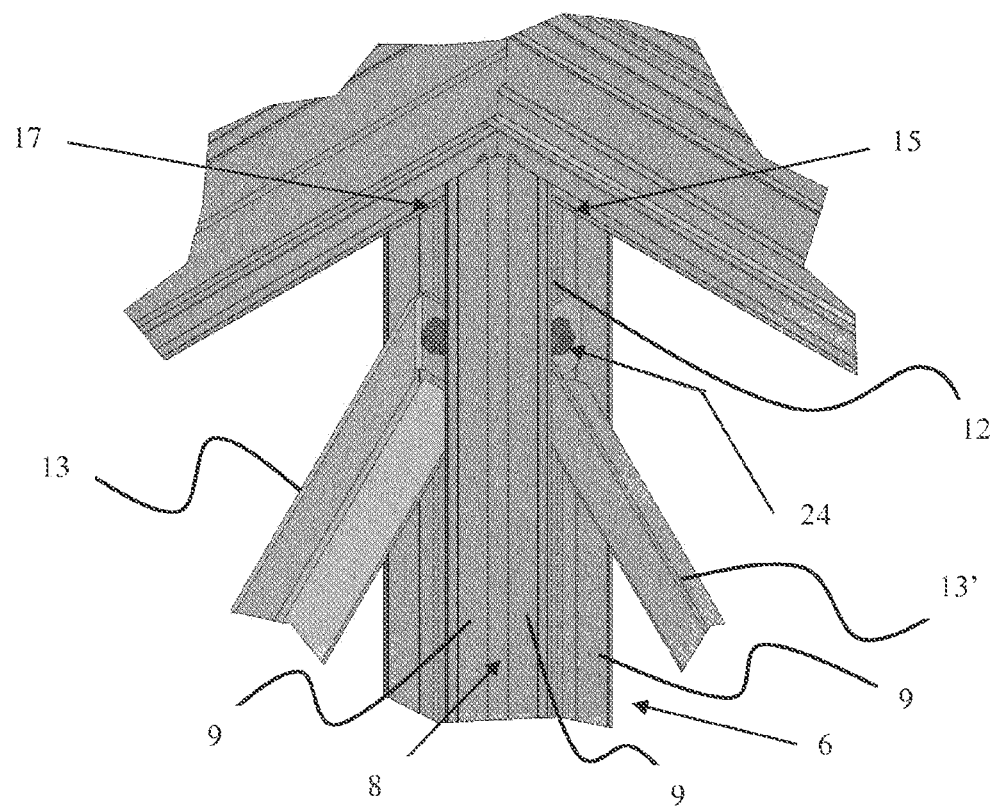
Fig. 9 (Detail A)

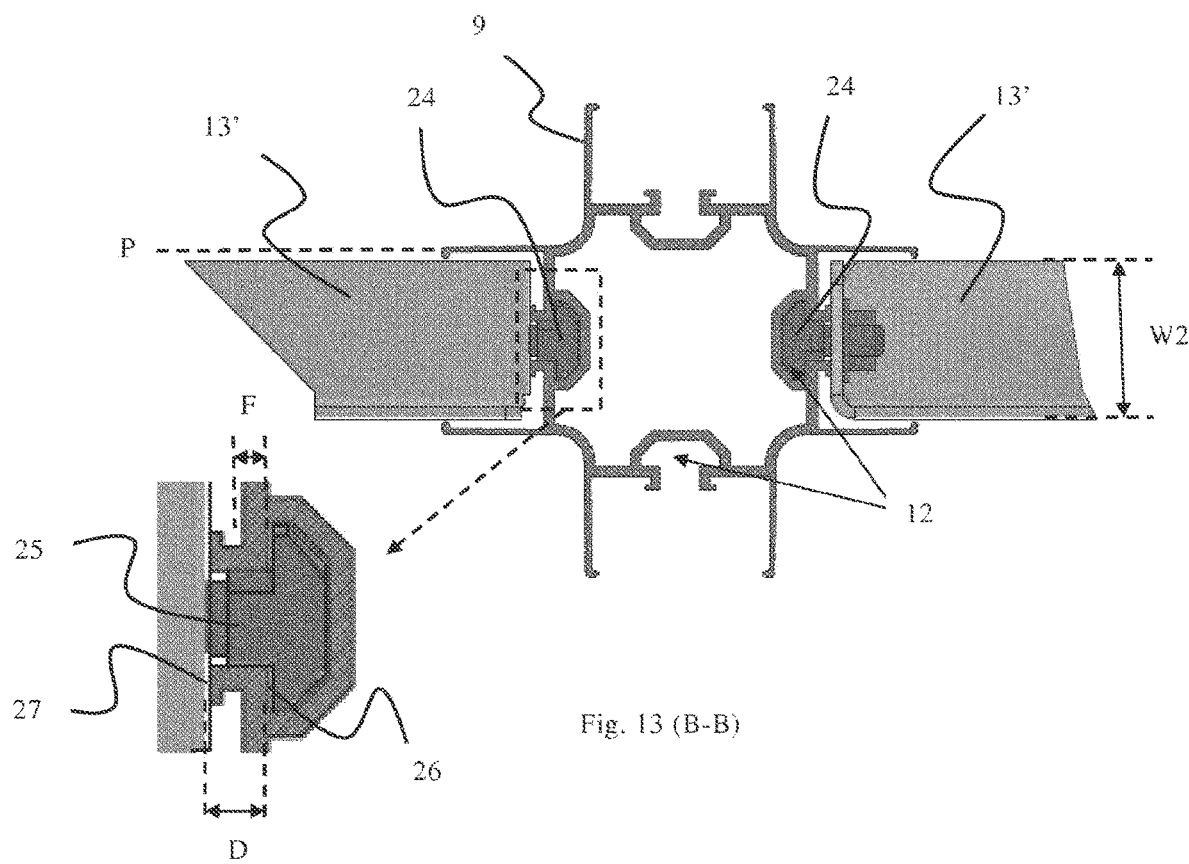
Fig. 13 (B-B)
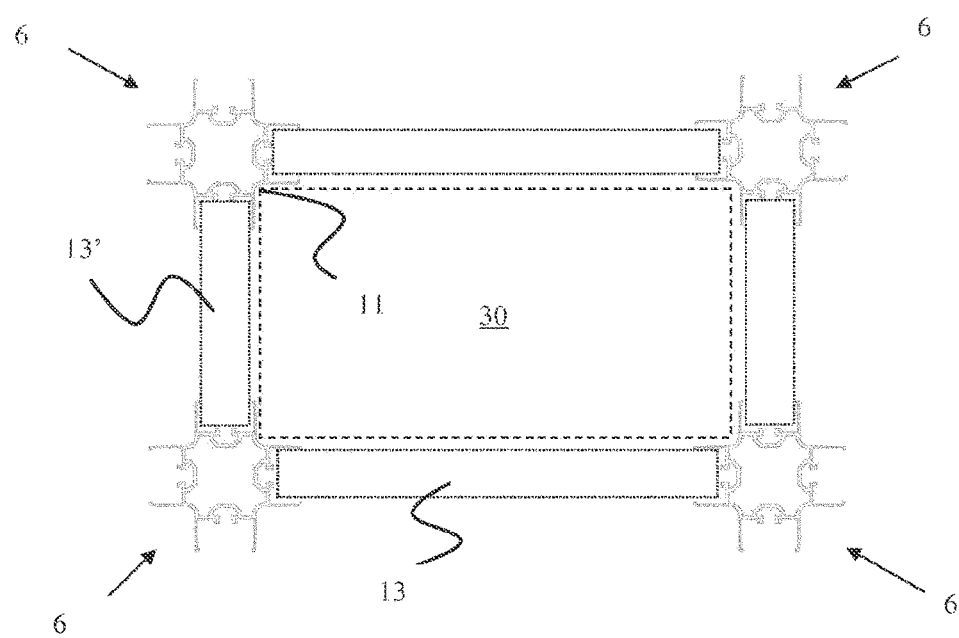
Fig. 14 (C-C)

STORAGE SYSTEM

TECHNICAL FIELD

The present invention relates to the field of automated storage systems.

BACKGROUND

The Applicant's already known AutoStore system is an automated storage system comprising a three-dimensional storage grid structure wherein storage bins/containers are stacked on top of each other to a certain height. Such a prior art system is shown in FIG. 1.

The storage system is disclosed in detail in for instance NO317366, WO 2014/090684 A1 and WO 2015/193278 A1.

The storage system 10 comprises a grid structure 20, see FIG. 2, constructed of aluminium profiles/uprights 1 interconnected by top rails 5. The profiles define multiple storage columns 2, in which the storage bins 30 may be stacked vertically one on top of another.

A cross-sectional view of a prior art profile 1 is shown in FIG. 3 and a cross-sectional view of a storage column 2 for accommodating a stack of storage bins 30 is shown in FIG. 4.

A number of remotely operated vehicles 40, or robots, are arranged on the top rails 5 and may move horizontally on top of the storage grid.

Each vehicle is equipped with a lifting device for picking up, carrying, and placing storage bins 30 that are stored in the storage grid.

The system also comprises picking and/or supply stations 60, where one or several product items are picked out from the storage bin 30 or where one or several product items are placed into the storage bin 30.

When a product item stored in a storage bin is to be picked from the storage grid, the robot is arranged to pick up the storage bin containing that product type and then transport it to a bin lift 50. The bin lift transports the storage bin to the picking and/or supply station 60, where the item of the product type is retrieved from the storage bin. The storage bin with the remaining product items is thereafter returned to the storage grid by means of a bin lift and a robot. The picking and/or supply station 60 illustrated in FIG. 1 is only shown schematically as a simple table upon which the storage bin is arranged.

The same procedure is used for supplying product items into the storage grid. First, items are supplied into a storage bin at a picking and/or supply station. The bin lift then lifts the storage bin up to the upper level where a robot transports the storage bin to its correct position within the storage grid.

A storage control and communication system is used to monitor inventory, to keep track of the location of respective storage bins (within storage grid and/or during transport), the content of each storage bins etc. Further, the storage control and communication system may also comprise, or may be provided in communication with, a control system for controlling the robots to pick a desired storage bin and to deliver it at the desired location at the desired time—without colliding with other robots.

To ensure sufficient stability of the grid structure 20, the prior art storage systems are dependent on an auxiliary grid supporting structure (not shown) arranged at least partly along the periphery of the grid. The requirement of having an auxiliary grid supporting structure is disadvantageous for a number of reasons. The supporting structure occupies space/area which could otherwise be utilized by the storage grid, i.e. it prevents optimum use of available space/area for storage; the need of a supporting structure may limit the available options for positioning of the storage system, i.e. the supporting structure may prevent the optimum positioning of the storage system since the auxiliary grid supporting structure often requires connection to a surrounding structure, such as the inner walls of a building; and the requirement of a supporting structure is not cost efficient.

In view of the prior art, the purpose of the present invention is to provide a storage system having a storage grid structure that is not as dependent on an auxiliary grid supporting structure, i.e. to provide a free-standing storage grid or at least a storage grid requiring a less extensive auxiliary grid supporting structure.

SUMMARY OF THE INVENTION

The present invention is defined by the attached claims and in the following:

In a first aspect, the present invention provides a storage system comprising a storage grid structure and multiple remotely operated storage bin handling vehicles, the storage grid structure comprises a first and a second type of vertical storage column profiles defining multiple storage columns in which storage bins are stored one on top of another in vertical stacks, the storage column profiles are interconnected at their top ends by rails forming a horizontal rail grid upon which the bin handling vehicles may move in two perpendicular directions, wherein
  the first type of storage column profiles has a cross-section comprising a hollow centre section and four corner sections, each corner section comprises two perpendicular bin guiding plates (i.e. comprises two bin guiding plates being perpendicular to each other) for accommodating a corner of a storage bin, and
  the second type of storage column profiles has a cross-section comprising a hollow centre section having at least two connecting elements, and at least one corner section, the corner section comprises two perpendicular bin guiding plates for accommodating a corner of a storage bin,
wherein the storage grid structure comprises a grid supporting structure comprising at least some of the second type of storage column profiles interconnected via their connecting elements by vertically inclined support struts.

In an embodiment of the storage system, the first type of storage column profiles comprises at least two connecting elements similar to the second type of storage column profiles. In an embodiment the first type and the second type of storage column profiles have the same cross-section. In embodiments, wherein the first and the second type of storage column profiles are the same, i.e. both types of profiles comprise at least two connecting elements, the inventive storage system may be defined as a storage system comprising a storage grid structure and multiple remotely operated storage bin handling vehicles, the storage grid structure comprises vertical storage column profiles defining multiple storage columns in which storage bins are stored one on top of another in vertical stacks, the storage column profiles are interconnected at their top ends by rails forming a horizontal rail grid upon which the bin handling vehicles may move in two perpendicular directions, wherein
  the storage column profiles have a cross-section comprising a hollow centre section having at least two connecting elements, and at least one corner section, the corner section comprises two perpendicular bin guiding plates for accommodating a corner of a storage bin, wherein the storage grid structure comprises a grid supporting structure comprising at least some of the storage column profiles interconnected via their connecting elements by vertically inclined support struts.

When any of the first or second type of storage column profiles comprises four corner sections, the corner sections are evenly distributed around the centre section, such that multiple profiles may provide multiple storage columns, wherein each profile may be common for four separate storage columns.

In an embodiment of the storage system, the support struts have a width allowing them to be connected to a connecting element without crossing a plane of an adjacent bin guiding plate, such that any support strut connected to a second type of storage column profile will not interfere with a storage bin whose corner is accommodated by a corner section comprising the adjacent bin guiding plate.

In an embodiment of the storage system, the support struts have a width allowing them to be connected to a connecting element without crossing a plane extending from a bin guiding plate of one column profile and a corresponding bin guiding plate of an adjacent column profile, such that any support strut connected to a second type of storage column profile will not interfere with a storage bin whose corners on one side are guided by the bin guiding plates.

In other words, the width of the support struts is such that no support strut will extend into a bin-shaped or rectangular space delimited by four corner sections, each corner section belonging to one of four separate storage column profiles forming a storage column.

In an embodiment of the storage system, the second type of storage column profiles comprises at least two corner sections, wherein two bin guiding plates, one of each of the two corner sections, are parallel and extend in the same direction forming a recess delimited by the two bin guiding plates and an external surface of the centre section, and the recess has a width (i.e. the distance between the parallel bin guiding plates) suitable for accommodating one of the inclined support struts.

In an embodiment of the storage system, one of the at least two connecting elements is arranged in, or at, the external surface of the centre section delimiting the recess.

In an embodiment of the storage system, the second type of storage column profiles comprises four connecting elements, and four corner sections, each of the connecting elements is arranged in a recess delimited by two parallel bin guiding plates, and each recess has a width suitable for accommodating an inclined support strut.

In an embodiment of the storage system, each of the support struts comprises a first connecting end and a second connecting end for interconnecting two separate second type of storage column profiles via their connecting elements. Each of the connecting ends comprises a surface inclined with respect to a longitudinal centerline of the support strut, such that the support strut is inclined when interconnecting two storage column profiles.

In an embodiment of the storage system, each of the support struts has a cross-section which extends more in the vertical direction than in a horizontal direction. In one embodiment, the support strut comprises two perpendicular plate elements and has an L-shaped cross-section, such that the support capacity of the strut is not restricted by the maximum width of the strut. In other words, the cross-section of the strut may have a height larger than the width of the recess.

In an embodiment of the storage system, a first wall-shaped framework of the storage grid structure comprises at least some of the second type of storage column profiles interconnected via their connecting elements by vertically inclined support struts; the support struts are arranged in line and extend from a position at an upper corner of the first framework and towards a base of the storage grid structure. The support struts are arranged in line such that the upper corner is prevented from tilting in the vertical plane of the first framework in a direction away from the base. Alternatively, the wall-shaped framework may be termed a planar vertical framework.

In an embodiment of the storage system, a second wall-shaped framework of the storage grid structure, being perpendicular to the first wall-shaped framework, comprises at least some of the second type of storage column profiles interconnected via their connecting elements by vertically inclined support struts; the support struts are arranged in line and extend from a position at an upper corner of the second framework and towards the base of the storage grid structure, and the first and second wall-shaped framework have one of the second type of storage column profiles in common (i.e. such that the upper corner is prevented from tilting in a direction away from the base). In other words, the combination of the first and second wall-shaped framework ensures that the upper corner is prevented from tilting.

In an embodiment of the storage system, the second type of storage column profile common for the first and second wall-shaped framework has a top end at the upper corner of the first and second wall-shaped framework, respectively.

In an embodiment of the storage system, the storage grid structure has at least one storage column comprising two to four, preferably four, of the second type of storage column profiles interconnected by multiple vertically inclined support struts.

In an embodiment of the storage system, the connecting elements are attachment grooves or attachment ribs.

In an embodiment of the storage system, the attachment ribs comprise a flared connecting portion distal to an external surface of the centre section. When the second type of storage column profile comprises attachment ribs, each connecting end of the support struts preferably comprises a clamp assembly for connecting the end to an attachment rib. In a further embodiment, the flared connecting portion is forked to provide a resilient interaction with the clamp assembly.

In an embodiment of the storage system, each of the at least two attachment grooves comprises (or is flanked by) parallel lips/flanges extending from an external surface of the centre section. In other words, each attachment groove comprises a lip along each longitudinal edge of the groove. Preferably, each lip comprises a strut abutting surface for interaction with any of a first and second connecting end of a support strut. When the second type of storage column profile comprises attachment grooves, each connecting end of the support struts has preferably a hole for connecting the end to an attachment groove, preferably by use of a T-bolt.

In a second aspect, the present invention provides a storage column for a storage system according to the first aspect, comprising four of the second type of storage column profiles interconnected via their connecting elements by vertically inclined support struts. The storage column of the second aspect may advantageously comprise four of the storage column profiles according to the third aspect below.

In a third aspect, the present invention provides a storage column profile for a storage system according to any of the embodiments of the first aspect, wherein the cross-section of the storage column profile comprises a hollow centre section, at least two connecting elements, and at least one corner section, wherein the connecting elements are arranged in, or at, the centre section; and the corner section comprises two perpendicular bin guiding plates for accommodating a corner of a storage bin.

In an embodiment, the storage column profile comprises four connecting elements and four corner sections, wherein each of the connecting elements is arranged in a recess delimited by two of the corner sections.

In an embodiment of the storage column profile, each recess is delimited by two parallel bin guiding plates, one bin guiding plate from each of the two corner sections delimiting the recess.

In an embodiment of the storage column profile, the connecting elements are attachment grooves or attachment ribs.

In an embodiment of the storage column profile, the attachment ribs comprise a flared connecting portion distal to an external surface of the centre section. In yet an embodiment, the flared connecting portion is forked.

In an embodiment of the storage column profile, each of the at least two attachment grooves comprise (or is flanked by) parallel lips/flanges extending from an external surface of the centre section. In other words, each attachment groove comprises a lip/flange along each longitudinal edge of the groove. Preferably, each lip comprises a strut abutting surface for interaction with any of a first and second connecting end of a support strut.

The corner sections of the storage column profile according to the third aspect, when featuring four corner sections, are evenly arranged around the centre section, i.e. each corner section centered in a direction staggered 90 degrees in relation to a neighboring corner section.

The term «storage column profile» is intended to mean a longitudinal metal element having the same cross-section over its whole length. The cross-section of the storage column profile is the cross-section transverse to the longitudinal direction of the profile. The storage column profile may be made by extrusion, for example, of a lightweight material like aluminium.

The term "grid supporting structure" is intended to mean a structure able to stabilize a storage grid structure against horizontal components of an applied force. In the present invention, a grid supporting structure is an integral part of the storage grid structure.

BRIEF DESCRIPTION OF THE DRAWINGS

Embodiments of the invention will now be described in greater detail by way of example only and with reference to the following drawings:

FIG. 8 is a perspective view of a grid supporting structure for an exemplary storage system according to the invention.

FIG. 9 shows a detail of the supporting structure in FIG. 8.

FIG. 13 is a cross-sectional view B-B of the assembly in FIG. 11 showing a storage column profile connected to two support struts.

FIG. 14 is a cross-sectional view C-C of one of the storage columns of the assembly in FIG. 11.

DETAILED DESCRIPTION

As discussed above, the prior art storage system shown in FIG. 1 is dependent on having an auxiliary grid supporting structure (not shown), since the grid structure itself is not sufficiently stable towards forces having a substantial horizontal component. Such forces may be present, in particular as a result of movement and acceleration of the remotely operated vehicles 40, or robots, arranged on the grid of rails 5 on top of the grid structure.

Figure 1:
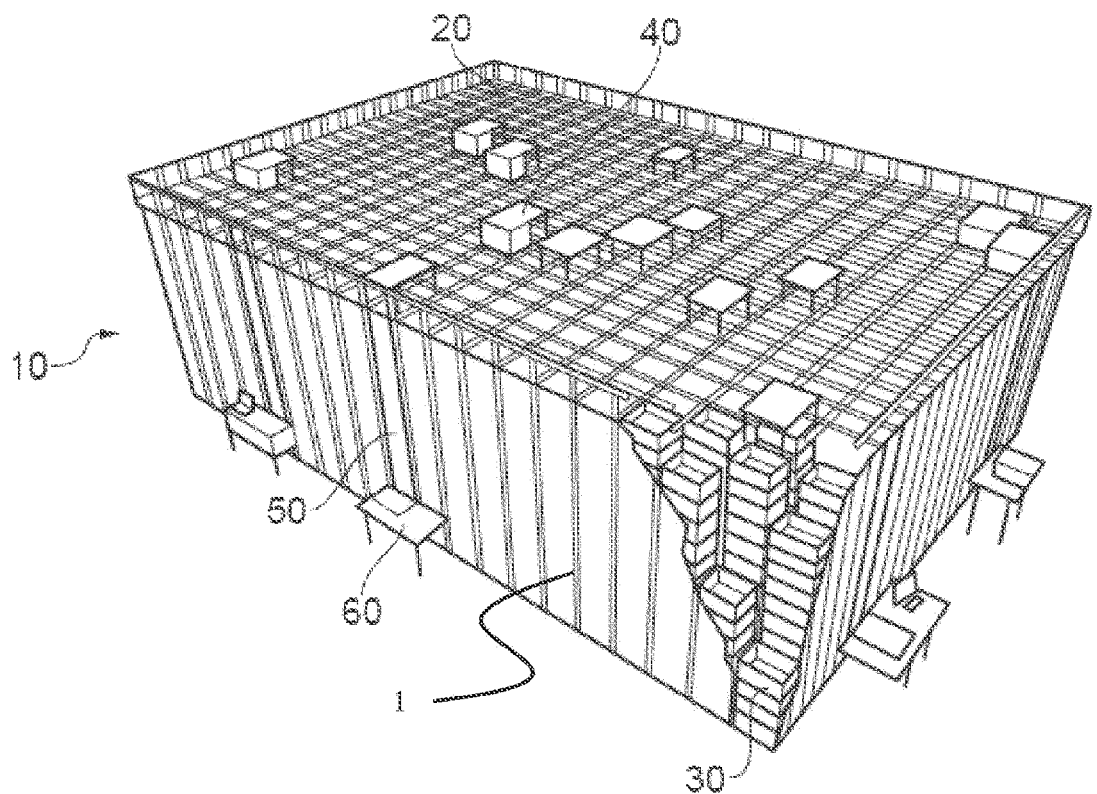
FIG. 1 is a perspective view of a prior art storage system.
Figure 2:
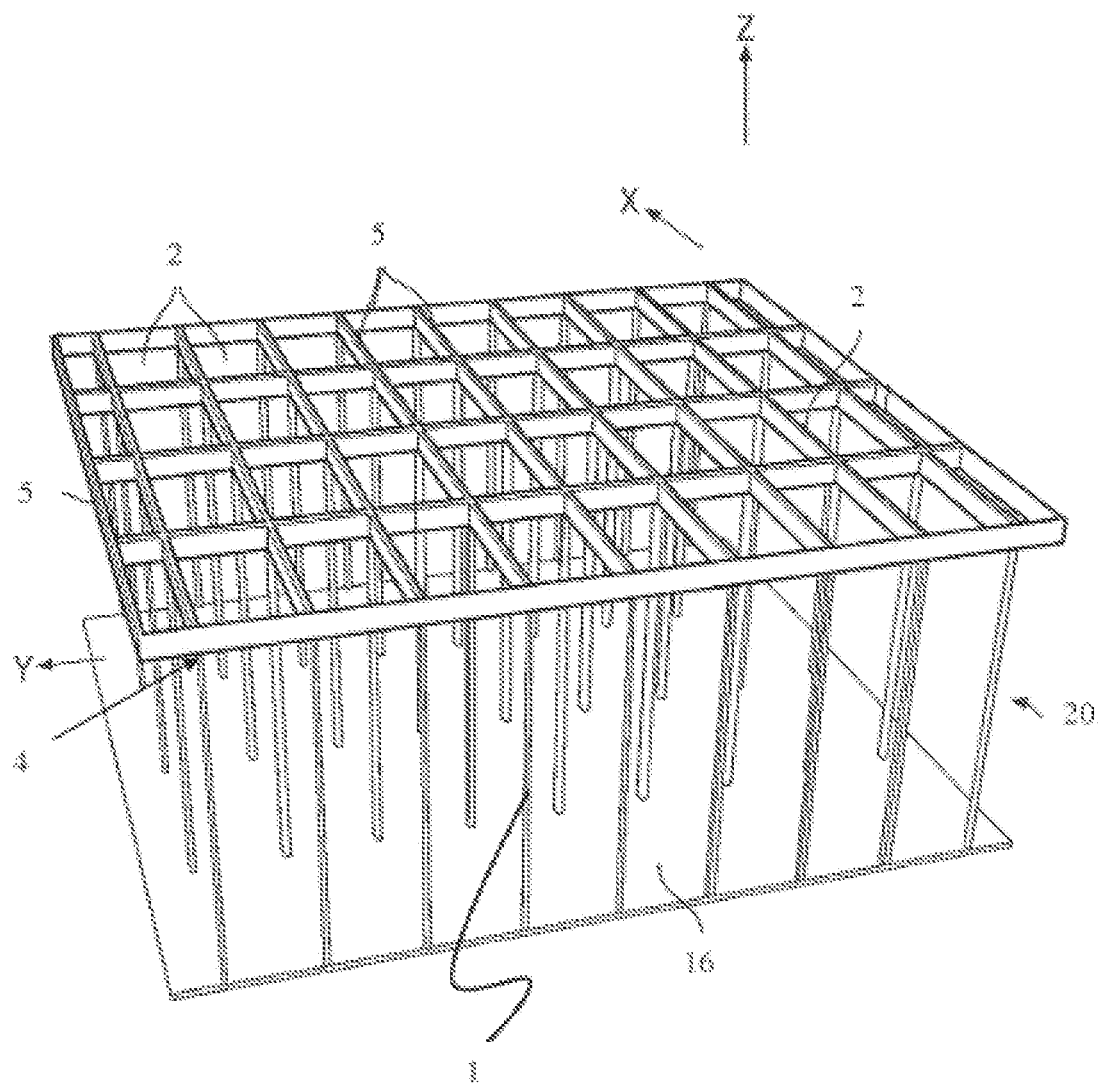
FIG. 2 is a perspective view of the grid structure of the prior art storage system in FIG. 1.
Figure 3:
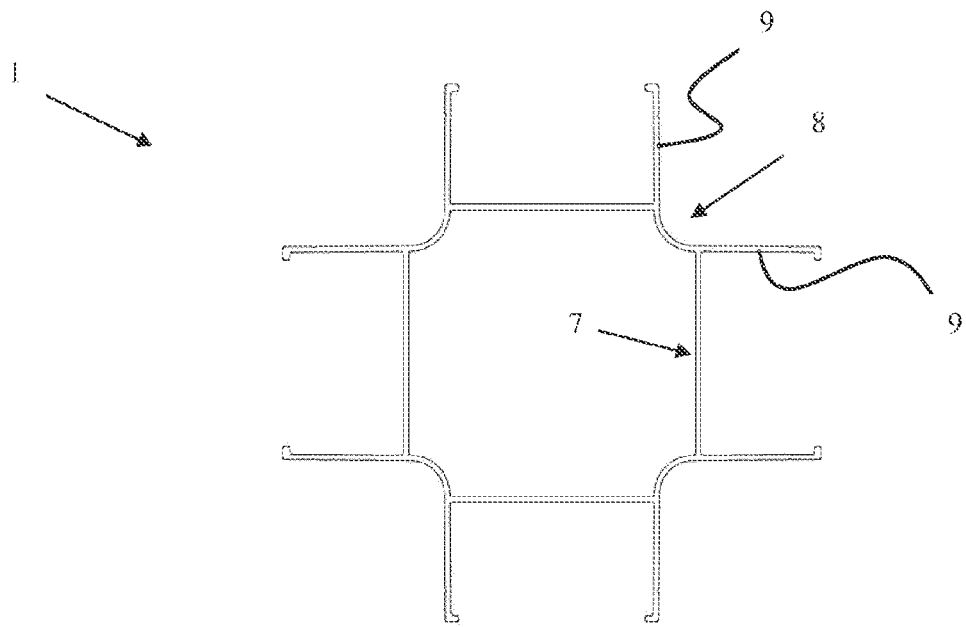
FIG. 3 is a cross-sectional view of a prior art storage column profile.

The grid structure 20 of the prior art storage system in FIG. 1 is made up of multiple vertical profiles 1 (i.e. a first type of storage column profiles), see FIG. 3, interconnected at their top ends 4 by rails 5. Four profiles 1 make up a storage column 2, in which multiple storage bins may be stacked. The profiles 1 have a cross-section featuring a hollow centre section 7 and four corner sections 8, wherein each corner section comprises two perpendicular bin guiding plates 9. The two perpendicular bin guiding plates 9 are arranged to accommodate a corner 11 of a storage bin 30 (or a corner of a stack of storage bins). In other words, each of the corner sections 8 defines two sides of a substantially triangular area (or a triangular space considering the longitudinal dimension of the profile) which may accommodate a storage bin corner 11, see FIG. 4. The corner sections 8 are evenly arranged around the centre section 7, such that multiple profiles may provide multiple adjacent storage columns 2, wherein each profile may be common for up to four separate storage columns.

Figure 4:
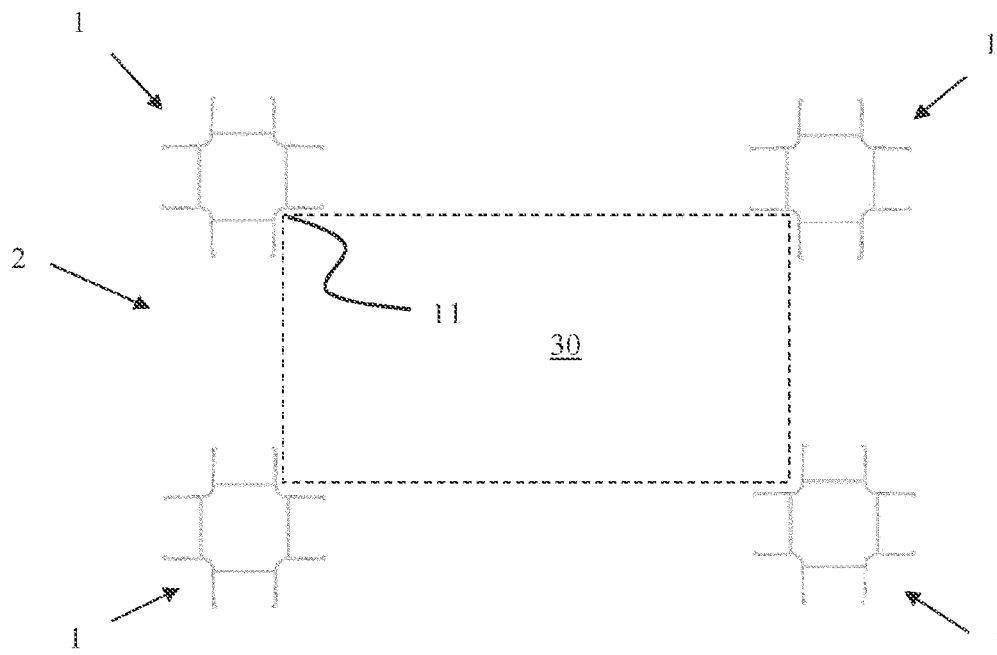
FIG. 4 is a cross-sectional view of a prior art storage column made up of four storage column profiles as shown in FIG. 3.

A cross-sectional view of a storage column 2, made up of four prior art profiles 1, is shown in FIG. 4. The cross section of the profile is constant over the whole length of the profile. The horizontal periphery of a storage bin 30 having four corners 11 is shown to illustrate how the storage bin (or stack of storage bins) is arranged in the storage column 2. The four corner sections 8, one from each of the four profiles 1, ensure that a storage bin 30 introduced into the storage column 2 is guided into a correct position relative to both any storage bin already present in the storage column and the stacks of storage bins in the surrounding storage columns.

Figure 5:
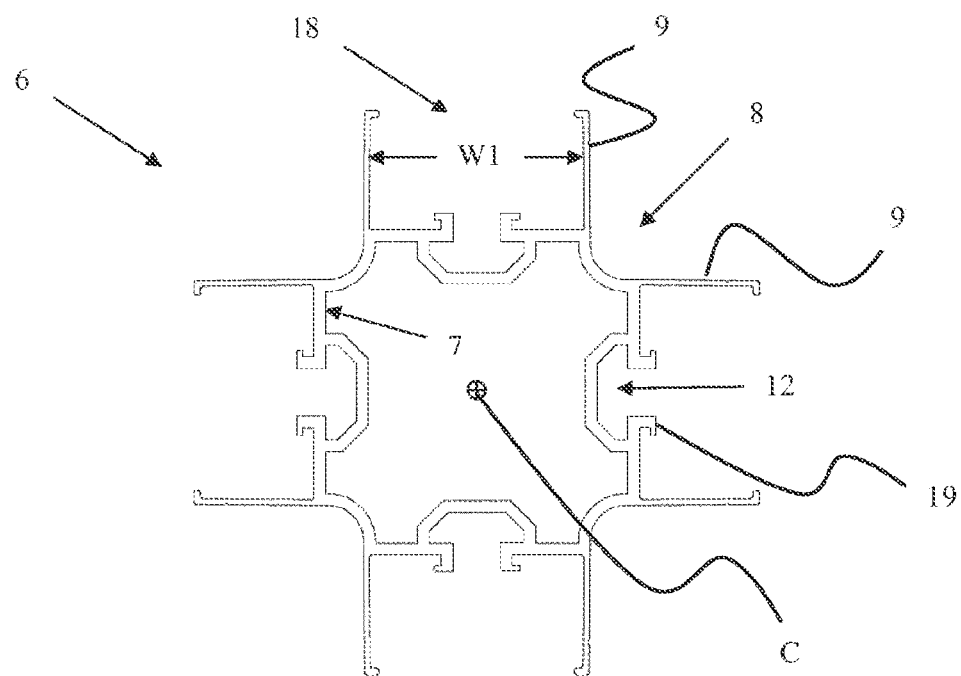
FIG. 5 is a cross-sectional view of an exemplary storage column profile according to the invention.

To obtain a storage system which is independent of having an auxiliary grid supporting structure, the applicant has developed a new, or second, type of profile 6 (i.e. a second type of storage column profile), see FIG. 5. The embodiment shown in FIG. 5 has a cross-section featuring a hollow centre section 7, having four attachment grooves 12 (i.e. connecting elements), and four corner sections 8, wherein each corner section 8 comprises two perpendicular bin guiding plates 9. The function of the corner sections 8 are as described above for the prior art profile. The corner sections 8 and the attachment grooves 12 are alternately and evenly arranged around a longitudinal centreline C of the centre section 7. In this manner, each of the attachment grooves 12 in the centre section 7 is arranged in a recess/space formed by two parallel bin guiding plates 9 of two adjacent corner sections 8. The recesses have a width W1.

Figure 6:
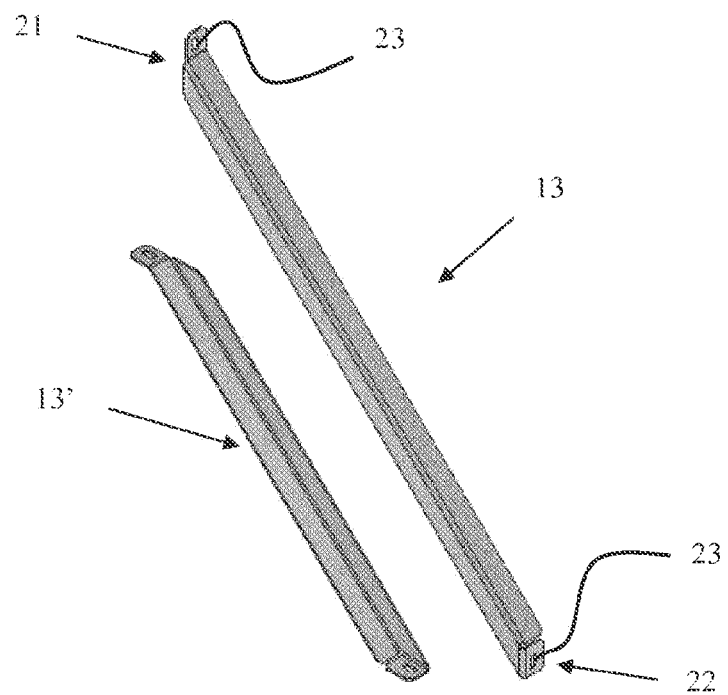
FIG. 6 is a perspective view of two exemplary support struts for use with the storage column profile in FIG. 5.

The attachment grooves allow multiple second type of profiles to be interconnected by inclined support struts, see FIG. 6. The support struts 13,13' have a width W2 (see FIG. 13) narrower than the width W1 of the recesses of the profiles 6, thus allowing them to be inserted into the recesses and into contact with the attachment grooves 12. The disclosed support struts have a first connecting end 21 and a second connecting end 22, each connecting end having a hole through which the support struts may be connected to an attachment groove 12 by use of for instance T-bolts, see FIG. 13. The connecting ends 21,22 are inclined with respect to a longitudinal centerline of the support strut, such that the support strut is inclined in a vertical direction when interconnecting two of the second type of profile. The angle in which the support struts are inclined is commonly between 30-60 degrees, preferably about 45 degrees. Preferred storage systems commonly feature storage bins having a rectangular cross-section. Consequently, the support struts 13, 13' are provided in two different lengths to allow for interconnection of the second type of profiles 6 at two different distances.

The attachment grooves 12 have lips 19 extending from the longitudinal edges of the grooves to obtain a secure connection of the support struts 13,13' by use of T-bolts. The lips have a substantially L-shaped cross-section. T-bolts, see FIG. 13, have a neck section 25 (i.e. a longitudinal section without a thread) which requires a certain minimum distance D between an internal surface 26 of the attachment groove 12 and a strut abutting surface 27 (i.e. a surface on the profiles for interaction with the first or second connecting end of a support strut) on the second type of profiles 6. The distance D is required to obtain a sufficient tightening of the T-bolt connection. In this embodiment, the strut abutting surface 27 is arranged on the lips 19, ensuring that the distance D is adequate without having to increase the thickness F of the walls making up the hollow centre section. Thus, by featuring the lips 19, the second type of profiles 6 is as light as possible. A further advantageous effect of the lips is that that they reinforce the edges of the attachment grooves, providing an increased torsional strength.

By use of the second type of profiles it is possible to construct storage systems having a storage grid with an integrated grid supporting structure, which supporting structure does not compromise the storage capacity of the storage grid 20. Thus, the requirement of an auxiliary or external grid supporting structure is avoided.

Exemplary grid supporting structures for integration in the storage grid structure 20 of an automated storage system are shown in FIGS. 7-14.

Figure 7:
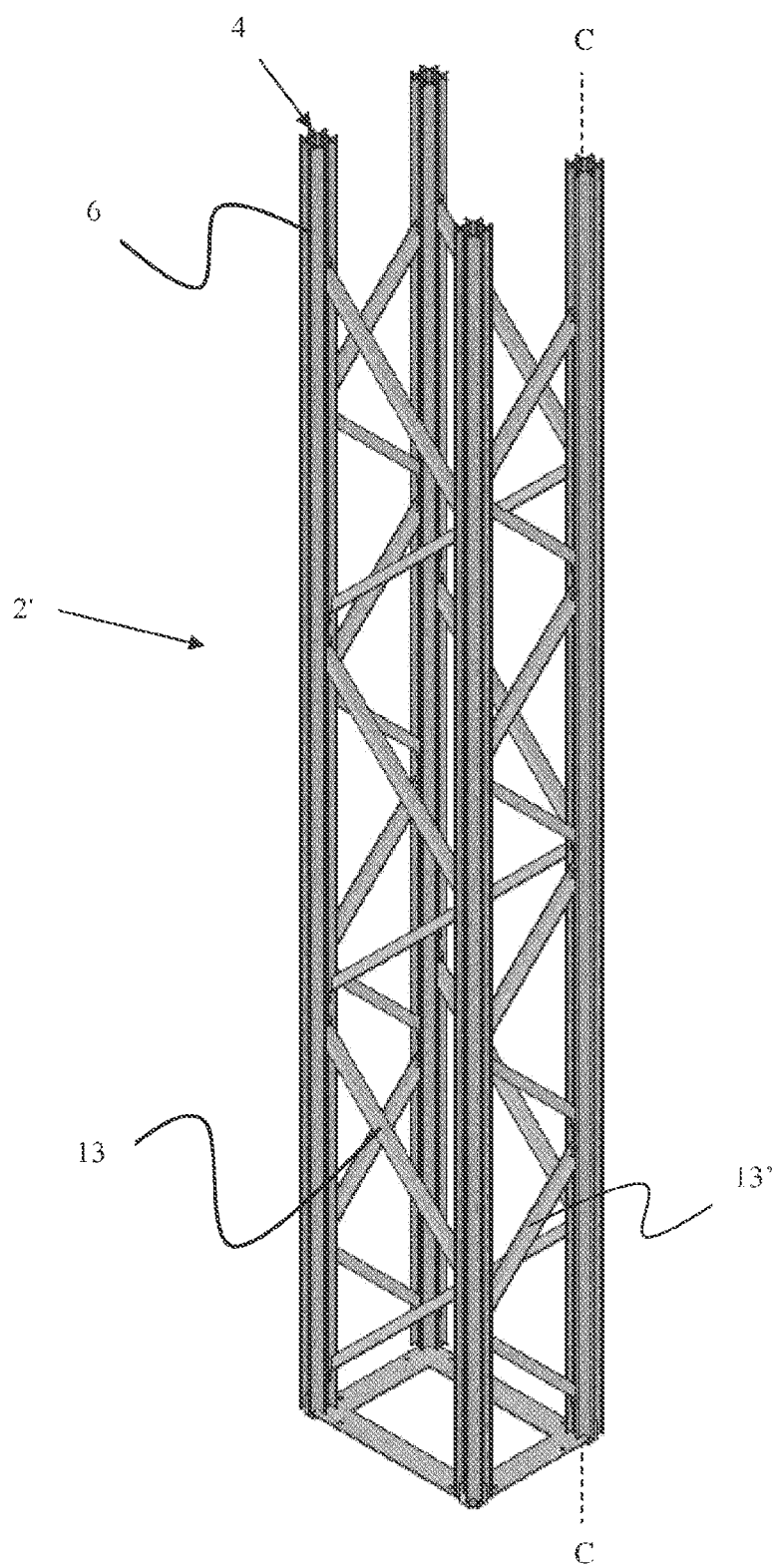
FIG. 7 is a perspective view of an exemplary storage column according to the invention.

A grid supporting structure arranged as a storage column 2' is shown in FIG. 7. The storage column is made up of four second type profiles 6 interconnected by multiple vertically inclined support struts 13,13'. By using support struts having a width which allows them to fit in between two parallel bin guiding plates 9, the ability of the storage column to accommodate a stack of storage bins is not compromised. In other words, the support struts 13,13' do not intersect/cross the plane Pin which an adjacent bin guiding plate 9 of a corner section 8 is arranged, see FIG. 13. A cross-sectional view of the storage column 2' is shown in FIG. 14, wherein the horizontal periphery of a storage bin 30 is shown in a dashed line for illustrative purposes. The cross-sectional view shows how the present invention provides a storage column 2' having both a full storage bin capacity and at the same time being able to provide support to a storage grid structure.

Figure 10:
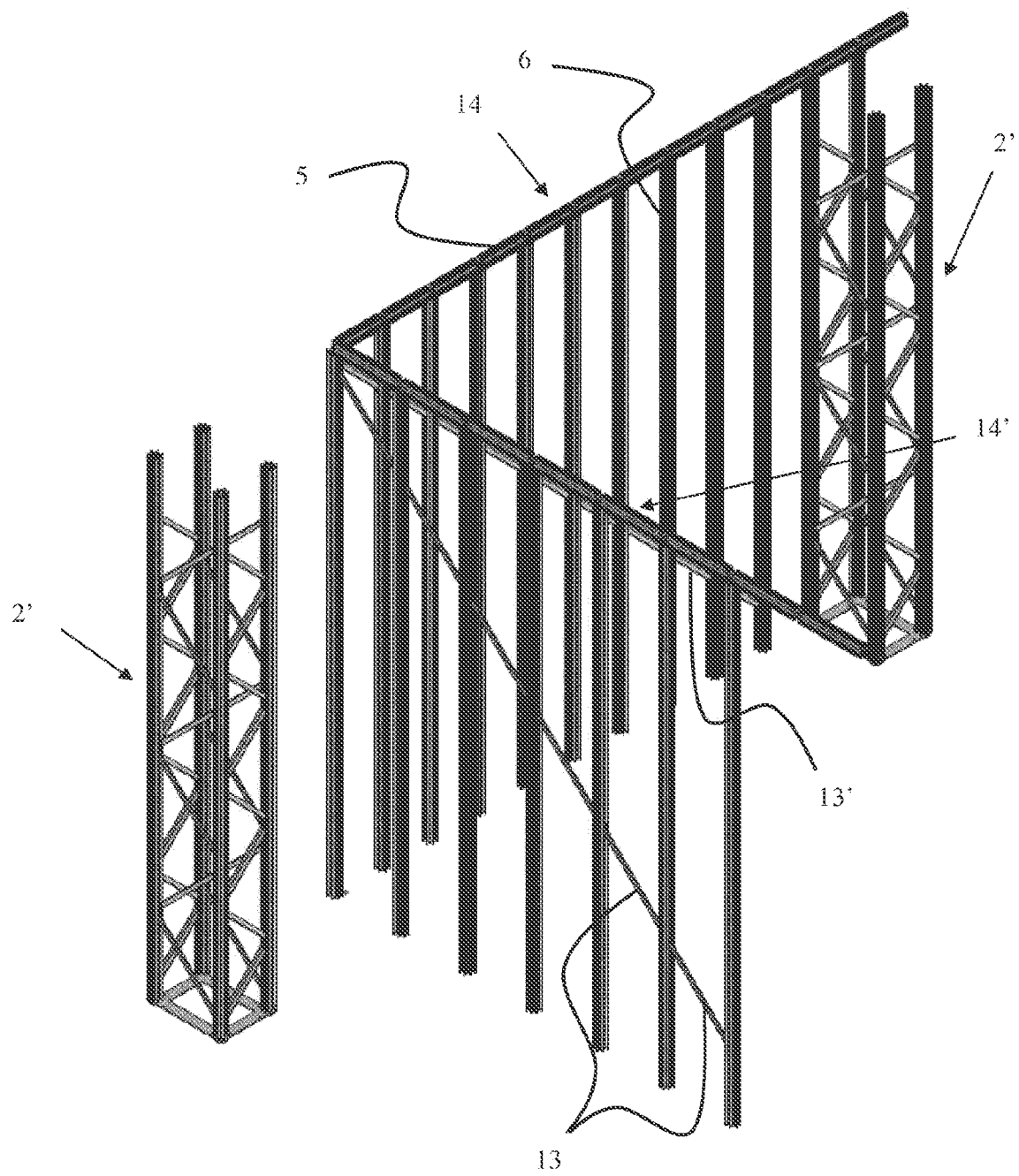
FIG. 10 is a perspective view of an assembly of the supporting structure in FIG. 8 and two storage columns as shown in FIG. 7.
Figure 11:
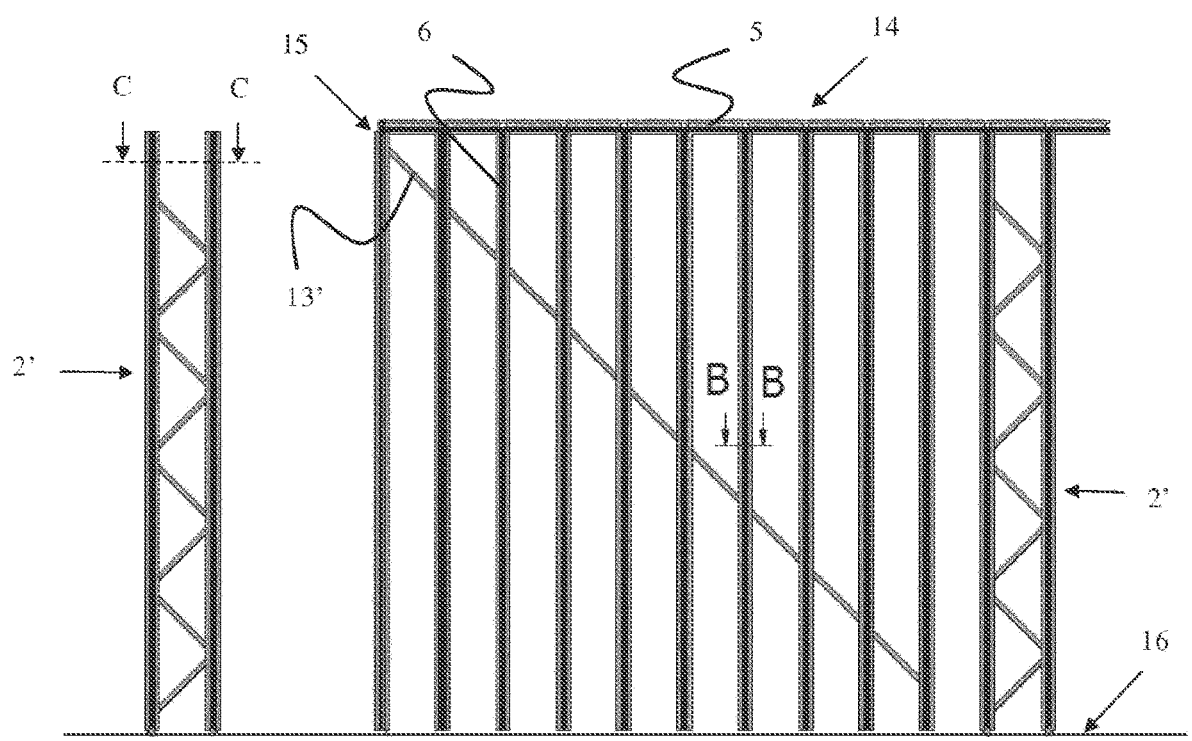
FIG. 11 is a sideview of the assembly in FIG. 10.
Figure 12:
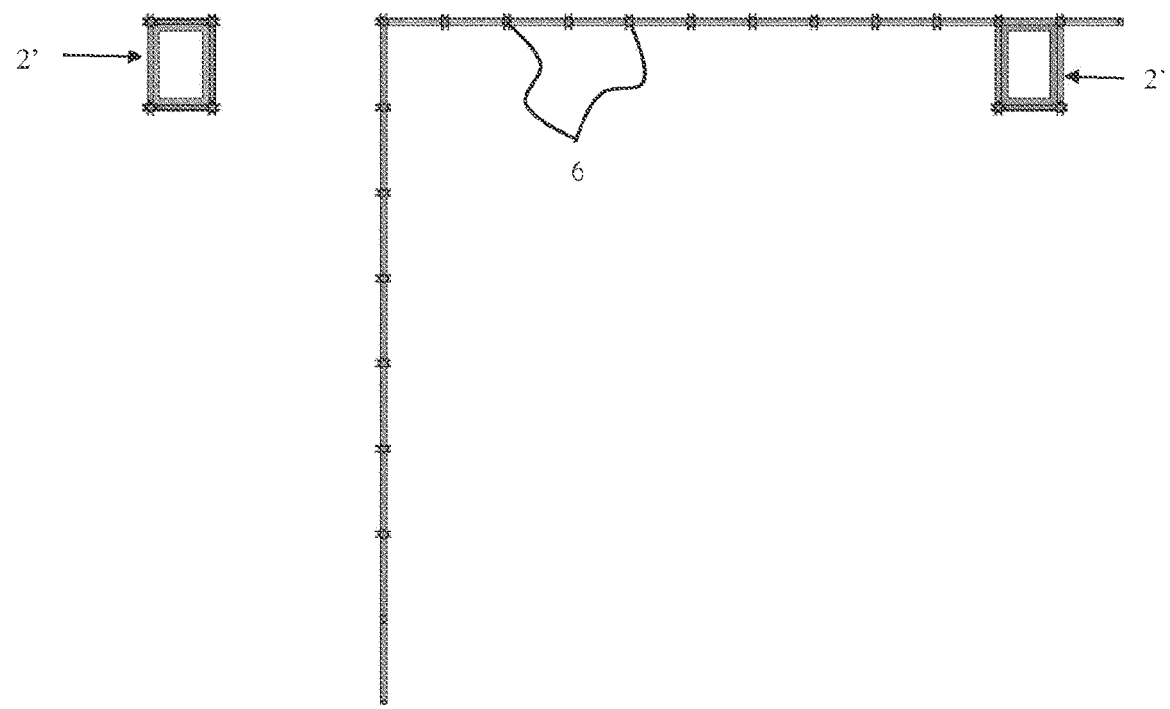
FIG. 12 is a topside view of the assembly in FIG. 10.

A grid supporting structure arranged as two wall-shaped frameworks 14,14' using a second type of profile 6 at a common corner is shown in FIGS. 8 and 9. A combination of two such wall-shaped frameworks 14,14' and a storage column 2' for a grid supporting structure is shown in FIGS. 10-12.

The first framework 14 comprises ten second type of profiles 6 interconnected by multiple vertically inclined support struts 13'. The support struts 13' are arranged in line to provide a brace extending from a position at an upper corner 15 of the framework 14 towards a base 16 upon which the grid supporting structure is arranged (i.e. the base of a storage grid structure 20 in which the framework is integrated). The second framework 14' is arranged perpendicular to the first framework and comprises seven second type of profiles 6 (including the profile in common with the first framework) interconnected by multiple vertically inclined support struts 13. The support struts 13 are arranged in line to provide a brace extending from a position at an upper corner 15 of the second framework 14' towards the base 16. In other embodiments, the number of support struts interconnecting the frameworks will depend on the angle at which the struts are inclined and the size, i.e. width and height, of the frameworks.

Figure 15A:
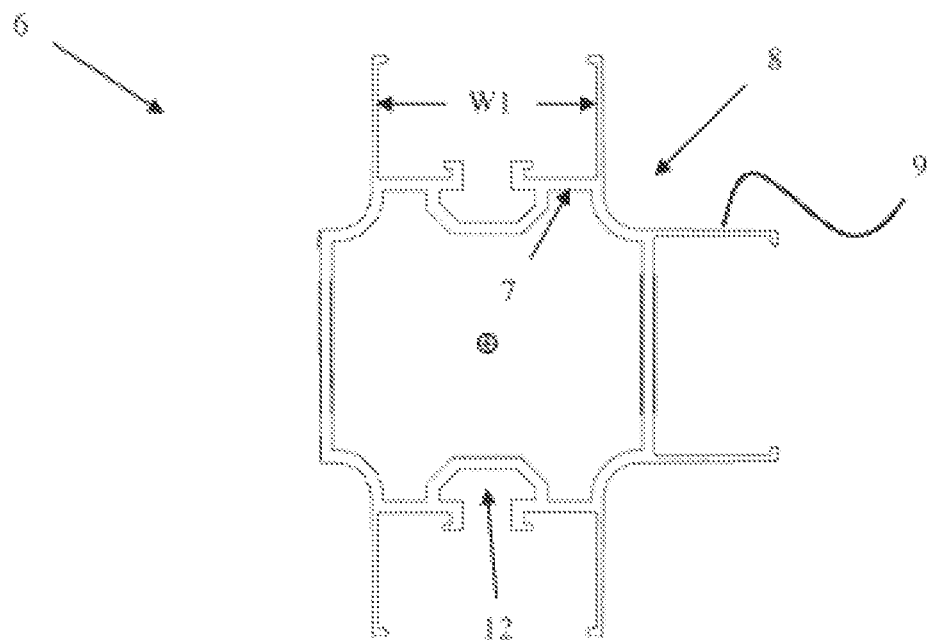
FIGS. 15a and 15b are cross-sectional views of further exemplary storage column profiles according to the invention.
Figure 15B:
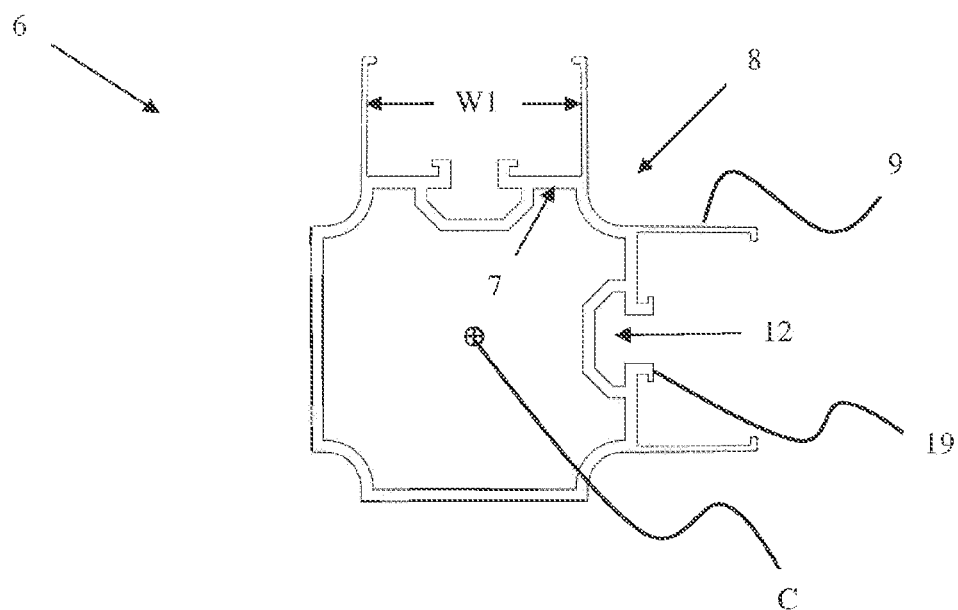

When being part of a wall-shaped framework structure as described above, wherein the frameworks 14,14' form a part of two perpendicular external sidewalls of a storage grid structure, i.e. the frameworks form an integral part of the sidewall, the second type of profiles 6 may alternatively be a simplified version of the profile shown in FIG. 5. That is, the profile being common to both of the wall-shaped frameworks, i.e. a common corner profile, requires only a single corner section 8 and two attachment grooves 12, the attachment grooves arranged in two directions, being perpendicular to each other, and on opposite sides of the corner section 8, see FIG. 15b. Further, the remaining profiles 6 of a wall-shaped framework 14,14' forming a part of an external sidewall of a storage grid structure will require two corner sections 8 and two attachment grooves 12, wherein the attachment grooves 12 are arranged in two opposite directions and the two corner section are arranged on the side of the profile facing into the storage grid structure, i.e. both of the two corner sections 8 are positioned on one side of a plane in which the two attachment grooves are arranged, see. FIG. 15a.

Thus, the wall-shaped frameworks 14,14' may in some embodiments be part of the external sidewalls of a storage grid structure to provide a horizontally stable storage grid. Depending on the specific location of the storage grid structure, the number and position of grid supporting structures integrated in the storage grid structure may vary. In some embodiments, for instance when one side of the storage grid structure may be supported by an external structure, like an inner wall of a building, only parts of the storage grid structure is supported by the integrated grid supporting structure.

In an exemplary storage system, a cuboid storage grid may for instance comprise a grid supporting structure in the form of two wall-shaped frameworks 14,14', as described above, arranged at each vertical corner. This would provide a freestanding storage grid not requiring any external support.

In alternative embodiments, the wall-shaped frameworks may advantageously be arranged as an internal part of a storage grid structure.

Figure 16:
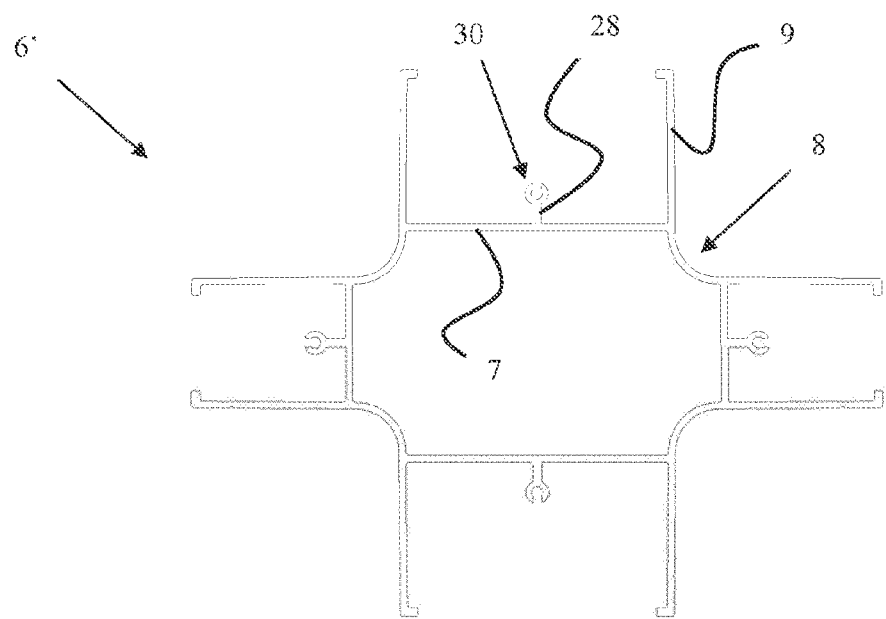
FIG. 16 is a cross-sectional view of an exemplary storage column profile according to the invention.
Figure 17:
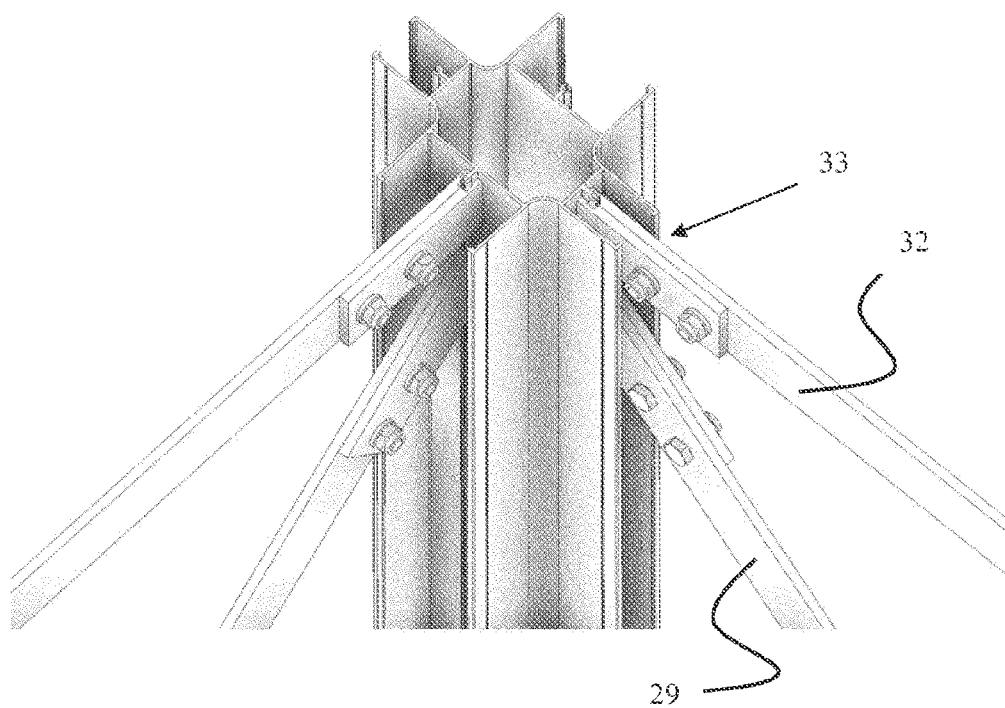
FIGS. 17 and 18 are perspective views of the storage column profile in FIG. 16 and further exemplary support struts connected thereto.
Figure 18:
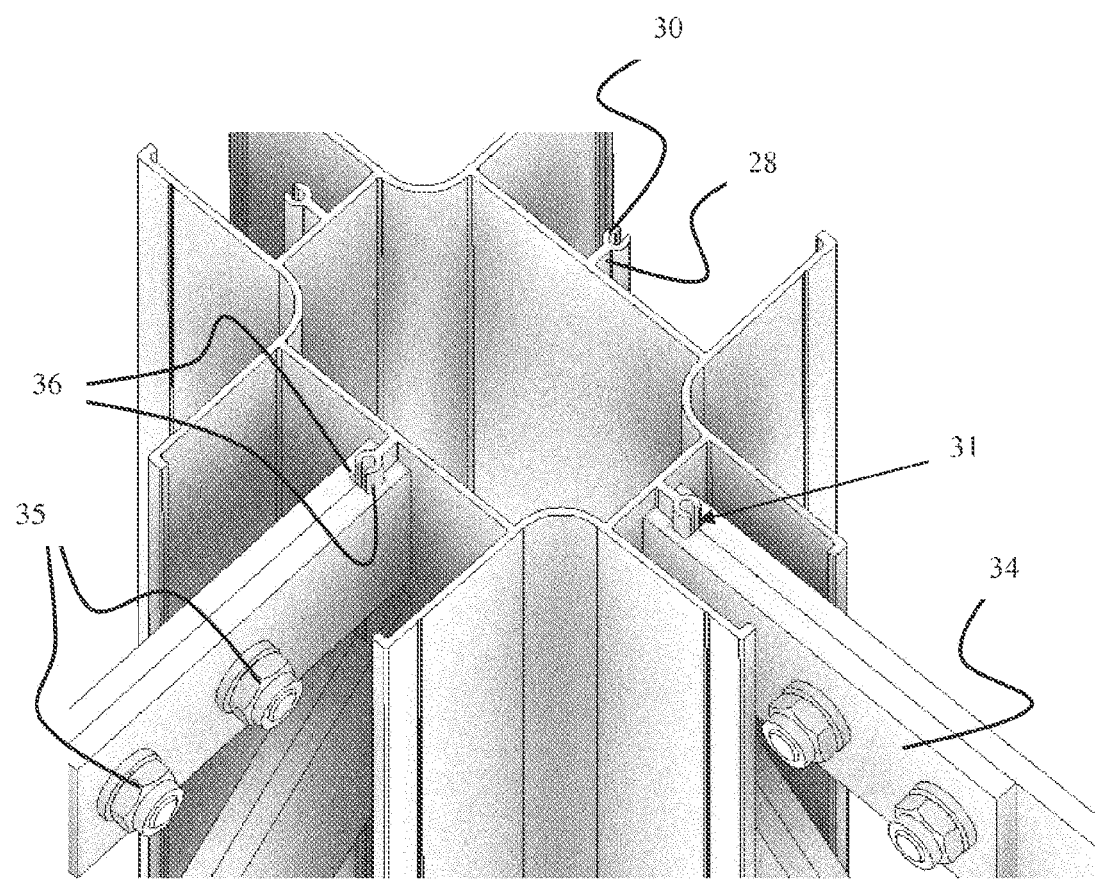
Figure 19:
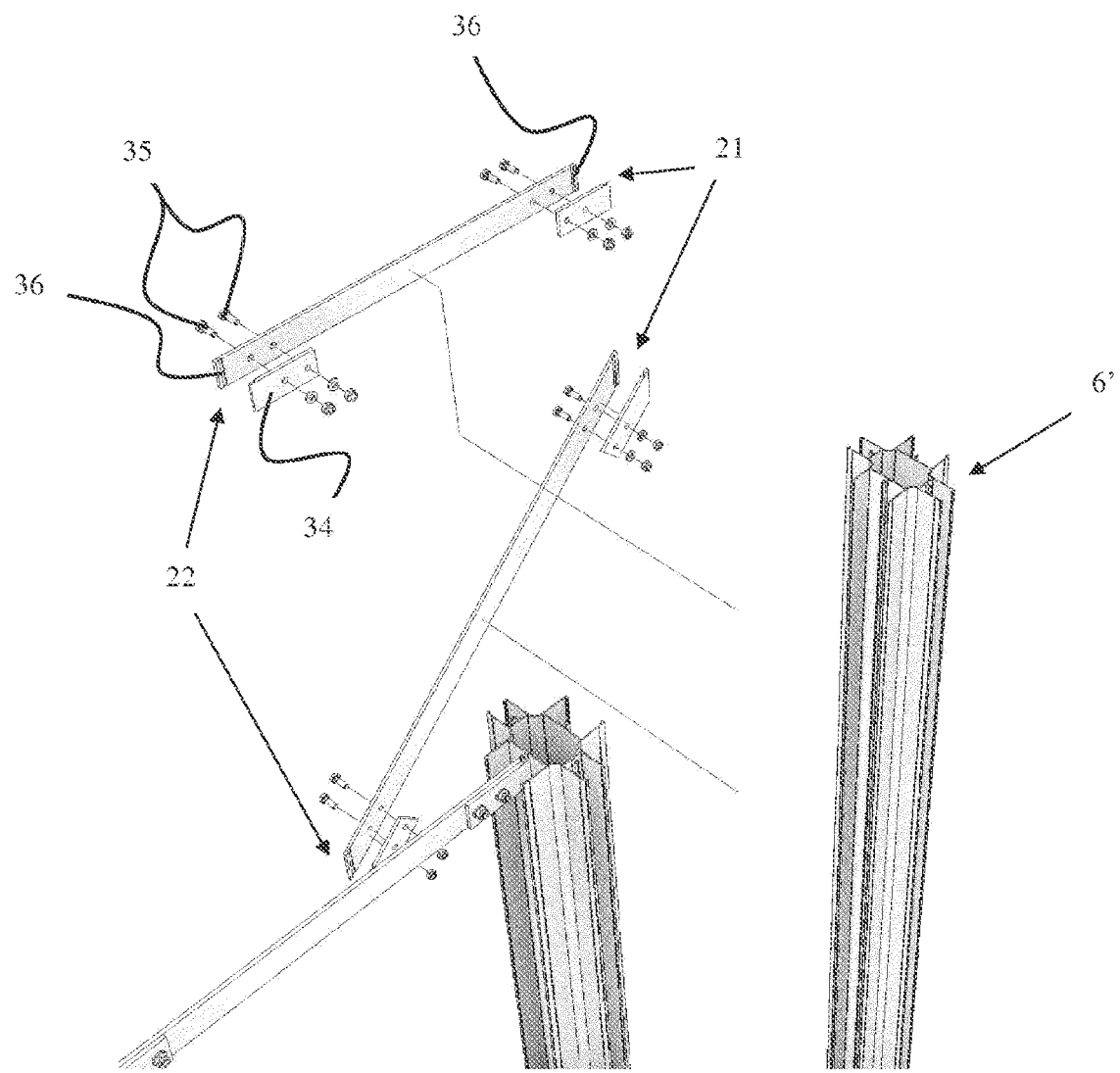
FIG. 19 is an exploded view of the exemplary support struts in FIGS. 17 and 18.

A cross-sectional view of a further exemplary embodiment of a second type of profile 6' is shown in FIG. 16. In this further embodiment, the attachment grooves 12 of the second type of profiles 6 described above is replaced by attachment ribs 28 (i.e. a connecting element), while the remaining features are the same. The rib features a connecting portion 30 distal to the center section 7. The connecting portion have a wider cross-section than the remaining part of the attachment rib, i.e. is flared, and is arranged for interaction with a corresponding recess 31 at the connecting ends 21,22 of the support struts 29, 32, see FIGS. 17-19. The support struts 29 are vertically inclined, while the support struts 32 are horizontal. The recess 31 is formed by a clamp assembly 33 at each of the connecting ends. The clamp assembly 33 comprises a fastening plate 34 connected to a connecting end of the support strut 29,32 by two bolts 35. The fastening plate and the connecting end comprises cooperating recess halves 36 providing the recess 31 in which the connecting portion of the attachment rib is clamped.

To improve the connection to the clamp assembly, the connecting portion 30 is preferably resilient. In this embodiment, this is obtained by having a forked connecting portion.

It is noted that the second type of profiles 6' are suitable for constructing grid supporting structures, such as the storage column 2' and the wall-shaped frameworks 14,14' disclosed above.

The present detailed description of the invention shows embodiments of the invention wherein the second type of profiles 6 is described in detail for use in grid supporting structures for integration in a typical prior art storage grid structure 20 comprising prior art profiles (i.e. the first type of profiles). Using a combination of the first and second type of profiles in a storage grid structure is the most cost-efficient solution, since the second type of profiles is more expensive to manufacture. Further, the second type of profile is slightly heavier than a corresponding first type of profile (i.e. a profile having four corner sections). However, the presence of the prior art profiles 1 in a storage grid structure is not a requirement, and in further embodiments, the second type of profiles 6 may also be used as the only type of profile in a storage grid structure.

The invention claimed is:

1. A storage system comprising:
a storage grid structure; and
a remotely operated storage bin handling vehicle,
wherein the storage grid structure comprises a first and a second type of vertical storage column profiles defining multiple storage columns in which storage bins can be stored one on top of another in vertical stacks,
wherein the first and second type storage column profiles are interconnected at top ends thereof by rails forming a horizontal rail grid upon which the remotely operated storage bin handling vehicle may move in two perpendicular directions,
wherein the first type of storage column profiles has a cross-section comprising a hollow centre section and four corner sections, each of the four corner sections of the first type of storage column profiles comprises two perpendicular bin guiding plates for accommodating a corner of a first storage bin,
wherein the second type of storage column profiles has a cross-section comprising a hollow centre section having at least two connecting elements arranged in, or on, an external surface of the hollow centre section, and at least one corner section, the at least one corner section of the second type of storage column profiles comprises two perpendicular bin guiding plates for accommodating a corner of a second storage bin,
wherein the storage grid structure comprises a grid supporting structure comprising at least two of the second type of storage column profiles interconnected, via the at least two connecting elements of the at least two second type of storage column profiles, by vertically inclined support struts,
wherein each of the vertically inclined support struts comprises a first connecting end and a second connecting end for interconnecting the at least two of the second type of storage column profiles via the corresponding connecting elements, and
wherein each the first and second connecting end has a hole connecting the first and second connecting end to an attachment recess of one of the second type of storage column profiles by use of a T-bolt.

2. The storage system according to claim 1, wherein the vertically inclined support struts have a width allowing them to be connected to the corresponding connecting element of the at least two second type of storage column profiles without crossing a plane extending from an adjacent bin guiding plate, such that the vertically inclined support strut will not interfere with the second storage bin.

3. The storage system according to claim 1, wherein the second type of storage column profiles comprises at least two of the at least one corner section, wherein at least two of the bin guiding plates, one from each of the at least two of the at least one corner sections, are parallel and extend in the same direction forming a recess delimited by the at least two of the bin guiding plates and the external surface of the hollow centre section of the second type of storage column profiles, and the recess has a width suitable for accommodating one of the vertically inclined support struts.

4. The storage system according to claim 3, wherein one of the at least two connecting elements of the second type of storage column profiles is arranged in, or on, the external surface of the hollow centre section of the second type of storage column profiles delimiting the recess.

5. The storage system according to claim 1, wherein the second type of storage column profiles comprises four of the connecting elements, and four of the corner sections, each of the four connecting elements is arranged in a recess delimited by two parallel bin guiding plates, and each recess has a width suitable for accommodating one of the vertically inclined support struts.

6. The storage system according to claim 1, wherein the vertically inclined support struts have a cross-section which extends more in a vertical direction than in a horizontal direction.

7. The storage system according to claim 1, wherein a first wall-shaped framework of the storage grid structure comprises at least three of the second type of storage column profiles interconnected, via the connecting elements, by the vertically inclined support struts; the vertically inclined support struts are arranged in a line and extending from a position at an upper corner of the first wall-shaped framework towards a base of the storage grid structure.

8. The storage system according to claim 7, wherein a second wall-shaped framework of the storage grid structure, being perpendicular to the first wall-shaped framework, comprises at least three of the second type of storage column profiles interconnected, via the connecting elements, by the vertically inclined support struts; the vertically inclined support struts are arranged in a line and extending from a position at an upper corner of the second wall-shaped framework towards the base of the storage grid structure, and the first and second wall-shaped framework have one of the second type of storage column profiles in common.

9. The storage system according to claim 1, wherein the storage grid structure has at least one storage column of the multiple storage columns comprising four of the second type of storage column profiles interconnected by the vertically inclined support struts.

10. The storage system according to claim 1, wherein the at least two connecting elements are attachment grooves or attachment ribs.

11. The storage system according to claim 1, wherein the at least two connecting elements are attachment grooves, and the attachment grooves comprise parallel lips extending from an external surface of the hollow centre section of the second type of storage column profiles.

12. The storage system according to claim 1, wherein the at least two connecting elements are attachment ribs, and the attachment ribs comprise a flared connecting portion distal to an external surface of the hollow centre section of the second type of storage column profiles.

13. The storage system according to claim 1, further comprising four of the second type of storage column profiles interconnected, via the at least two connecting elements of the at least four second type of storage column profiles, by the vertically inclined support struts.

14. The storage system according to claim 1, wherein the second type of storage column profiles comprises at least four of the at least two the connecting elements and at least four of the at least one corner sections, wherein each of the connecting elements is arranged in a recess delimited by two of the corner sections.

15. The storage system according to claim 14, wherein each recess is delimited by two of the corresponding bin guiding plates each of the two corner sections delimiting the recess.

16. The storage system according to claim 14, wherein the connecting element is an attachment groove comprising parallel lips extending from an external surface of the hollow centre section.

17. The storage system according to claim 14, wherein the connecting element is an attachment rib.

* * * * *